United States Patent [19]

Rozak et al.

[11] Patent Number: 5,864,815
[45] Date of Patent: Jan. 26, 1999

[54] METHOD AND SYSTEM FOR DISPLAYING SPEECH RECOGNITION STATUS INFORMATION IN A VISUAL NOTIFICATION AREA

[75] Inventors: Michael J. Rozak, Issaquah; Juha P. Salin, Bellevue; James H. Spoltman, Snohomish; Ronald A. Belgau, Port Angeles, all of Wash.

[73] Assignee: Microsoft Corporation, Redmond, Wash.

[21] Appl. No.: 508,757

[22] Filed: Jul. 31, 1995

[51] Int. Cl.$^6$ .......................................................... G10L 5/06
[52] U.S. Cl. .......................... 704/275; 704/270; 704/231; 395/326; 395/348
[58] Field of Search ................................ 395/2.84, 2.52, 395/2.43, 2.79, 345–348, 340; 364/513; 340/721

[56] References Cited

U.S. PATENT DOCUMENTS

| | | | |
|---|---|---|---|
| 4,509,133 | 4/1985 | Monbaron et al. | 364/513.5 |
| 4,677,569 | 6/1987 | Nakano et al. | 364/513.5 |
| 4,704,696 | 11/1987 | Reimer et al. | 364/513.5 |
| 4,766,529 | 8/1988 | Nakano et al. | 364/513.5 |
| 4,776,016 | 10/1988 | Hansen | 381/42 |
| 4,783,803 | 11/1988 | Baker et al. | 381/42 |
| 4,827,520 | 5/1989 | Zeinstra | 381/43 |
| 4,864,623 | 9/1989 | Van Nes et al. | 381/43 |
| 4,866,778 | 9/1989 | Baker | 381/43 |
| 4,903,012 | 2/1990 | Ohuchi | 340/709 |
| 4,931,950 | 6/1990 | Isle et al. | 364/513 |
| 4,987,411 | 1/1991 | Ishigami | 340/709 |
| 5,027,406 | 6/1991 | Roberts et al. | 381/43 |
| 5,075,675 | 12/1991 | Barker et al. | 340/721 |
| 5,157,384 | 10/1992 | Greanias et al. | 340/706 |
| 5,231,670 | 7/1993 | Goldhor et al. | 381/43 |
| 5,231,691 | 7/1993 | Yasuda | 395/2 |
| 5,255,341 | 10/1993 | Nakajima | 395/2 |
| 5,265,202 | 11/1993 | Krueger et al. | 395/158 |
| 5,357,596 | 10/1994 | Takebayashi et al. | 395/2.84 |
| 5,384,910 | 1/1995 | Torres | 395/156 |
| 5,386,494 | 1/1995 | White | 395/2.84 |
| 5,404,458 | 4/1995 | Zetts | 395/275 |
| 5,408,582 | 4/1995 | Colier | 395/2.52 |
| 5,425,141 | 6/1995 | Gedye | 395/157 |
| 5,444,617 | 8/1995 | Merialdo | 364/419.1 |
| 5,448,695 | 9/1995 | Douglas et al. | 395/155 |
| 5,465,378 | 11/1995 | Duensing et al. | 395/800 |
| 5,519,809 | 5/1996 | Husseiny et al. | 395/2.84 |
| 5,524,051 | 6/1996 | Ryan | 380/9 |
| 5,566,248 | 10/1996 | Ulrich | 382/187 |
| 5,590,264 | 12/1996 | Keane et al. | 395/340 |
| 5,602,963 | 2/1997 | Bissonnette et al. | 395/2.84 |
| 5,602,981 | 2/1997 | Hargrove | 395/352 |
| 5,617,526 | 4/1997 | Oran et al. | 395/326 |

OTHER PUBLICATIONS

Microsoft Corporation, "User's Guide—Microsoft® Word—The World's Most Popular Word Processor," Version 6.0, pp. 72–73, 1993–1994.

Kurzweil, "Kurzweil Brings Voice Dictation to Windows," *Byte,* 19(8):48, Aug., 1994.

Meisel, William S., "Talk to Your Computer," *Byte,* 18(11): 113, Oct., 1993.

Schmandt et al., "Augmenting a Window System with Speech Input," *Computer,* 23(8): 50–56, Aug., 1990.

Borgen et al., "Voice Navigator—Owner's Guide," *Articulate Systems, Inc.,* pp. 4, 11–12, 25–27, and 43–44, 1990.

"Integrated Audio–Graphics User Interface," *IBM Technical Disclosure Bulletin,* 33(11): 368–371, Apr. 1991.

"Software User's Guide," *Microsoft Windows Sound System Version 2.0,* pp. 28–70, 1993.

*Primary Examiner*—Richemond Dorvii
*Assistant Examiner*—Vijay B. Chawan
*Attorney, Agent, or Firm*—Westman, Champlin & Kelly, P.A.

[57] ABSTRACT

A speech recognition system provides a user with graphical and textual feedback. The textual feedback is displayed in windows but occupies little of the available display space and are displayed only for a short period of time. The graphical feedback is displayed in a designated notification area and does not obscure any other displayed items. The feedback provided by the speech recognition system may indicate a current mode of operation of the speech recognition system as well as a state of processing of audio input by the speech recognition system.

38 Claims, 14 Drawing Sheets

METHOD AND SYSTEM FOR DISPLAYING SPEECH RECOGNITION STATUS INFORMATION IN A VISUAL NOTIFICATION AREA

TECHNICAL FIELD

The present invention relates generally to computer systems and more particularly to speech recognition in computer systems.

BACKGROUND OF THE INVENTION

Speech recognition systems provide facilities for recognizing components of speech in audio input. When a speaker speaks into an audio input device, the speech recognition systems process the audio input to recognize speech components. One difficulty encountered with such speech recognition systems is the difficulty in informing the user of how the audio input was interpreted and whether the audio input was properly received and processed. Certain conventional speech recognition systems have attempted to address this problem by providing a user interface, such as a speech recognition window that provides feedback to the user about the progress and results of speech recognition. Unfortunately, such windows often obscure substantial portions of the available display space on the video display. In addition, such windows are typically displayed as long as the speech recognition system is running so that the windows continue to obscure portions of the video display while the speech recognition system is running.

SUMMARY OF THE INVENTION

The present invention overcomes the limitations of the prior art by displaying feedback to the user in a fashion that minimizes the extent and duration to which other displayed objects are obscured by the displayed feedback. In accordance with a first aspect of the present invention a method is practiced in a computer system that has a video display and an audio input device for receiving audio input. The computer system also includes a speech recognizer for recognizing components of speech in the audio input. The speech recognizer operates in one of a number of different modes of operation. For this method, a graphical user interface that includes a designated notification area for displaying graphical notifications is displayed on the video display. The current mode of operation of the speech recognizer is determined, and a graphical notification of the current mode of operation of the speech recognizer is displayed in the designated notification area.

In accordance with another aspect of the present invention, audio input is received from the user through an audio input device. The received audio input is processed by a speech recognizer to attempt to recognize components of speech. Textual feedback regarding the processing of the received audio input is displayed in a window that is displayed for only a predetermined period of time, such as a few seconds.

In accordance with a further embodiment of the present invention, the computer system includes a video display for displaying video images and an audio input device for receiving audio input from a user. The computer system additionally includes a speech recognizer for recognizing components of speech in audio input that is received by the audio input device. The computer system further includes a component for providing a graphical notification area on the video display for displaying graphical notifications to the user. The computer system also includes a facility for displaying a graphical notification in the graphical notification area that identifies a current mode of operation of the speech recognizer.

In accordance with yet another aspect of the present invention a computer system includes a video display, an audio input device and a speech recognizer. The computer system, likewise, includes a facility for displaying textual feedback to the user regarding processing of the received audio input by the speech recognizer in a window that is only displayed for a predetermined period of time.

In accordance with yet another aspect of the present invention, a computer-readable storage medium is designed for use in a computer system that includes a video display and an audio input device for receiving audio input from a user. The computer-readable storage medium stores a speech recognizer for recognizing components of speech in the audio input that is received by the audio input device. The computer-readable storage media also stores a first facility for providing a graphical notification area on the video display in which to display graphical notifications. The computer-readable storage medium further stores a second facility for displaying graphical notifications in the graphical notification area regarding the speech recognizer.

BRIEF DESCRIPTION OF THE DRAWINGS

A preferred embodiment of the present invention will be described below with reference to the following drawings.

DETAILED DESCRIPTION OF THE INVENTION

The preferred embodiment of the present invention provides a method and system for providing speech recognition status information to a user in a visual notification area. The information is displayed in a fashion that occupies very little of the available display space on the video display and much of the information is displayed in a transitory or temporary fashion so that any obstruction that is caused by the displaying of the status information is only temporary.

Figure 1:
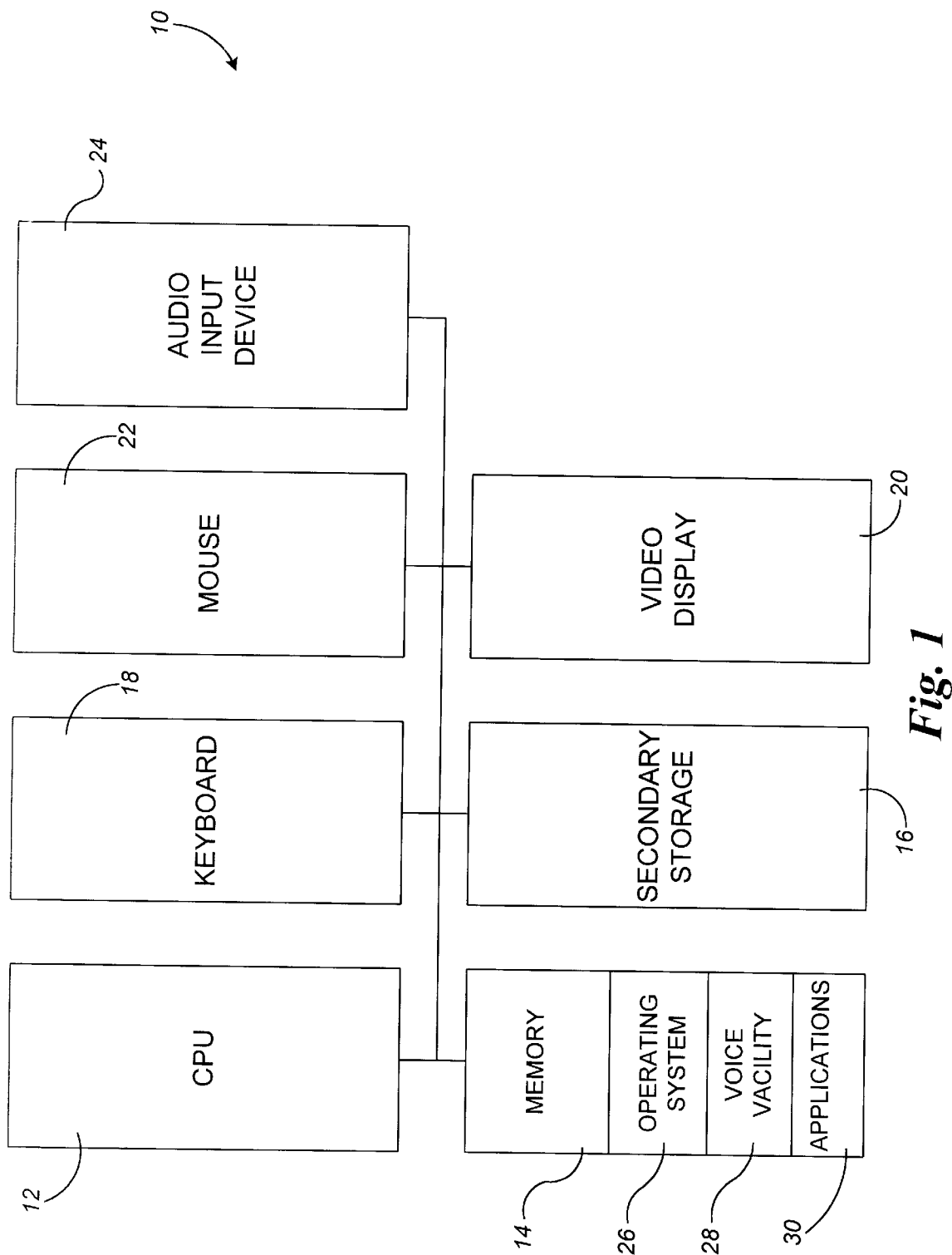
FIG. 1 is a block diagram of a computer system that is suitable for practicing the preferred embodiment of the present invention.

FIG. 1 shows a block diagram of a computer system 10 that is suitable for practicing the preferred embodiment of the present invention. Although the computer system 10 of FIG. 1 includes only a single processor, those skilled in the art will appreciate that the present invention may also be practiced in systems that employ multiple processors, including distributed systems. The computer system 10 of FIG. 1 includes a central processing unit (CPU) 10 that is accessed to a primary memory 14 and secondary storage 16. The secondary storage 16 may take many forms including a hard disk drive. The computer system 10 also includes a keyboard 18, a video display 20, a mouse 22 and an audio input device 24. The audio input device 24 may take the form of a microphone that is coupled to a sound board. The computer system 10 need not include all of these peripheral devices; rather, systems lacking one or more of these peripheral devices may be used to practice the present invention.

The memory 14 holds a copy of any operating system 26, voice facility 28 and application programs 30. For illustrative purposes in the discussion below, the operating system 26 is assumed to be the "MICROSOFT" "WINDOWS" '95 operating system sold by Microsoft Corporation of Redmond, Wash. The voice facility 28 includes a speech recognition engine for recognizing speech components in audio input and a voice command facility for responding to voice commands that are recognized by the speech recognizer. The application programs 30 may call upon facilities of the operating system 26 and the voice facility 28.

Figure 2:
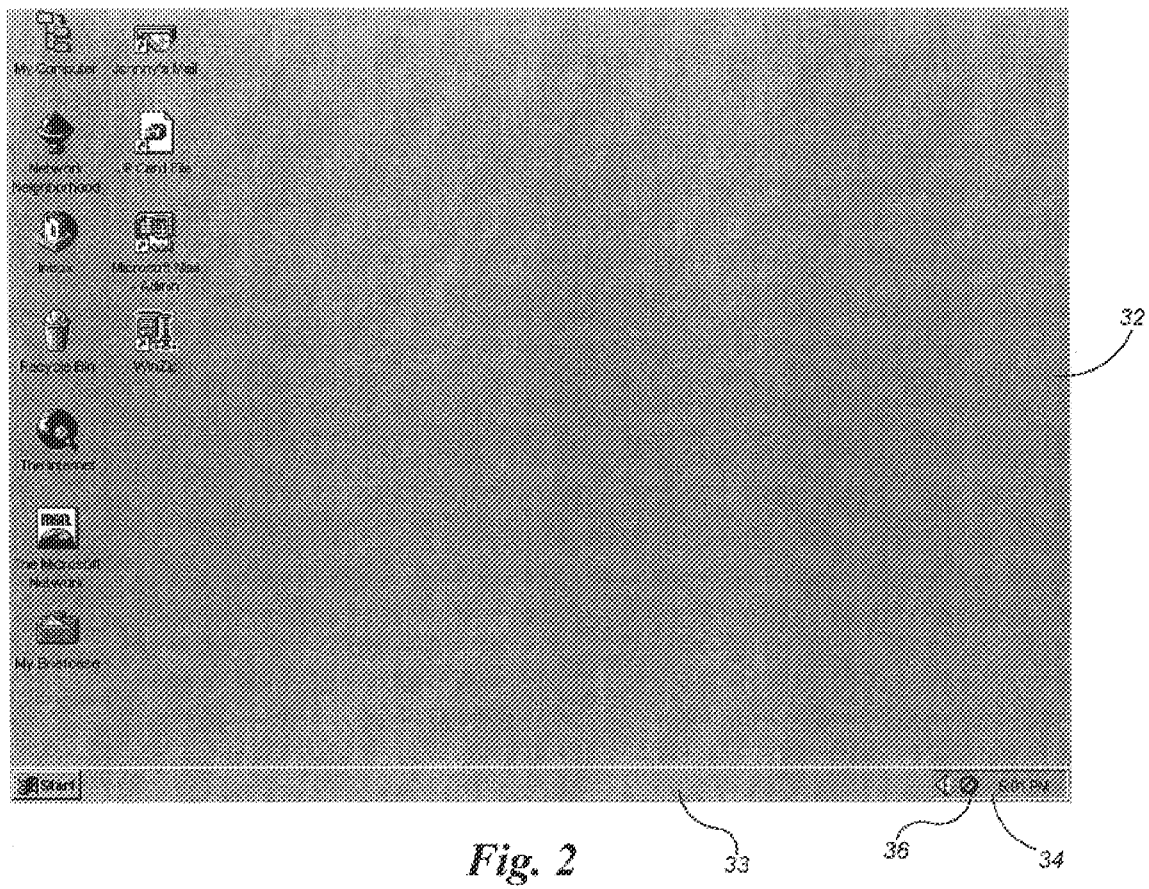
FIG. 2 is an example illustrating the display of a state icon for the voice facility in the visual notification area in accordance with the preferred embodiment of the present invention.

The preferred embodiment of the present invention relays status information regarding the current state of the voice facility 28. One way in which status information is relayed to user is by displaying icons within a visual notification area. As is shown in FIG. 2, the operating system 26 has a taskbar 33 in which buttons associated with active tasks are displayed. A predesignated portion of the taskbar 33 is designated as a taskbar visual notification area 34 in which application programs 30, the voice facility 28 and the operating system 26 may display icons to convey status information to a user. The taskbar visual notification area is described in more detail in co-pending application entitled "System Provided Visual Notification Area", Ser. No. 08/355,398, U.S. Pat. No. 5,617,526 which was filed on Dec. 13, 1994 and is assigned to a common assignee with the present application. The co-pending application is incorporated by reference herein.

In order to understand status information that is displayed by the voice facility 28, it is helpful to examine the different states which the voice facility may assume. The voice facility 28 may assume a listening state wherein the voice facility listens for audio input and processes all audio input. The voice facility 28 may also assume a not listening state wherein no audio input received by audio input device 24 is processed. Lastly, the voice facility 28 may assume a standing-by state wherein the voice facility analyses audio input that is received by the audio input device 24 but only is responsive to selected voice commands, including voice commands that are prefaced by a trigger phrase, such as "computer," and voice commands, such as "start listening," that change the state of the voice facility.

The current state of the voice facility 28 is reflected in an icon that is displayed within the taskbar visual notification area 34 (FIG. 2). FIG. 2 shows an example of the not listening state icon 36. The presence of the not listening icon 36 in the taskbar visual notification area 34 indicates that the voice facility is not currently listening to audio input from the audio input device 24. One of the strengths of displaying state icons in the visual notification area 34 is that it provides a known and easily recognizable location for displaying such information. Moreover, the icons displayed within the visual notification area 34 do not occupy any of the virtual desktop surface 32 and, hence, do not obscure other displayed items.

Figure 3:
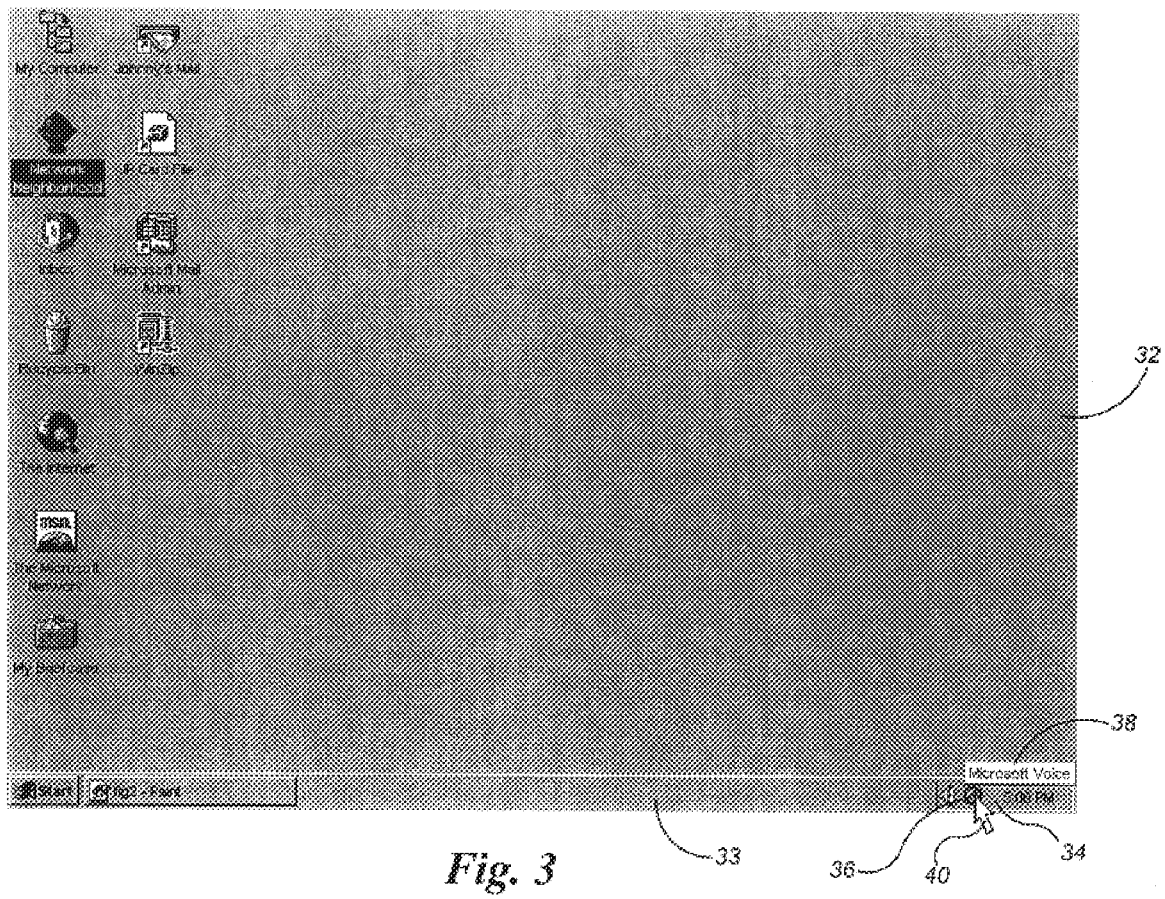
FIG. 3 illustrates the display of a tool tip when a mouse cursor points at a state icon for the voice facility in accordance with the preferred embodiment of the present invention.

If a user uses the mouse 22 (FIG. 1) or another input device to position a mouse cursor 40 (FIG. 3) over a state icon, a tool tip will be displayed. FIG. 3 shows an example wherein a mouse cursor 40 is positioned to point at the not listening state icon 36 which is displayed in the taskbar visual notification area 34. A tool tip 38 is displayed to indicate that the icon is associated with "MICROSOFT VOICE." The tool tip 38 is a small window that is displayed in proximity to the icon and that contains text. The tool tip is implemented as a clipped rectangle that displays text provided by the application associated with the icon. Thus, the voice facility 28 provides the text that is to be displayed within the clipped rectangle for the tool tip 38. The tool tip 38 is only displayed for a predetermined period of time, such as 2 or 3 seconds. After the expiration of the predetermined time, the tool tip 38 is no longer displayed and, thus, no longer occupies real estate on the virtual desktop 32.

Figure 4A:
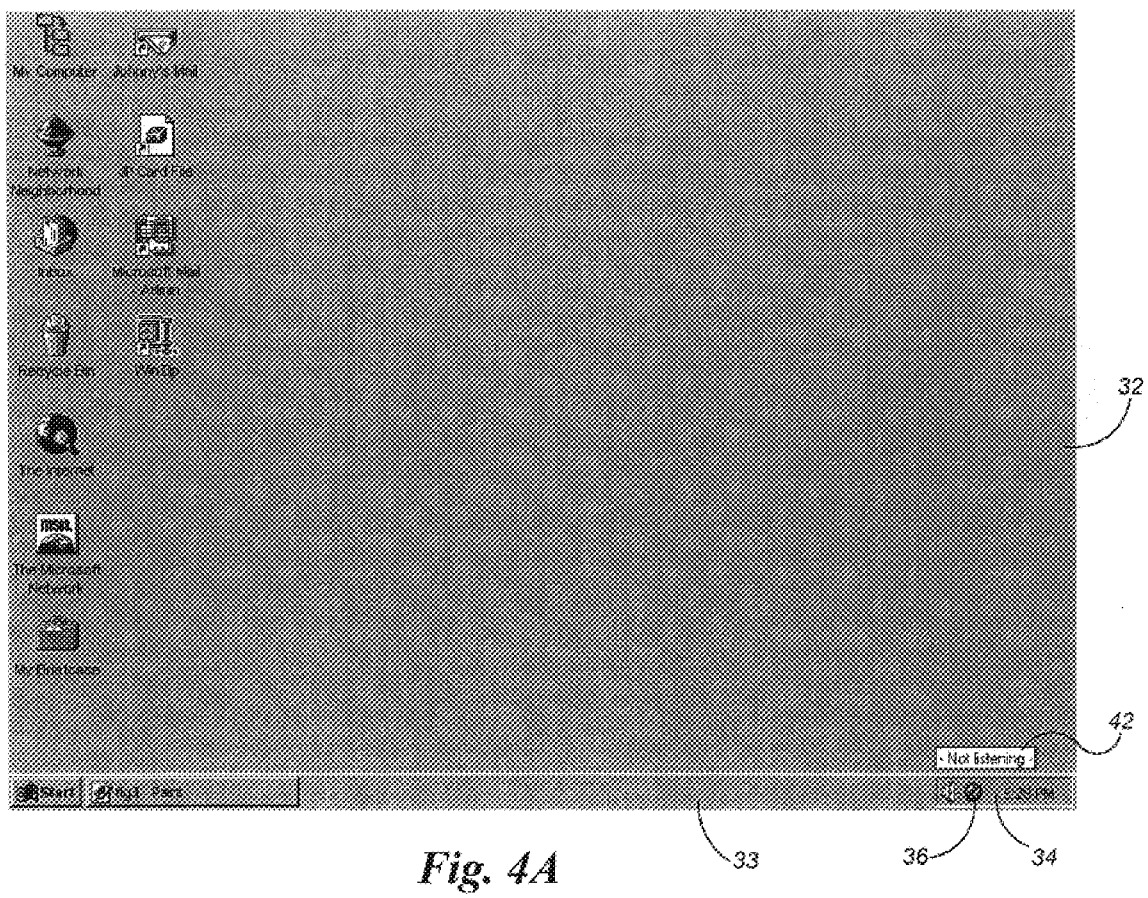
FIG. 4A illustrates the display of graphical and textual information in response to the changing the state of the voice facility to the not listening state.
Figure 4B:
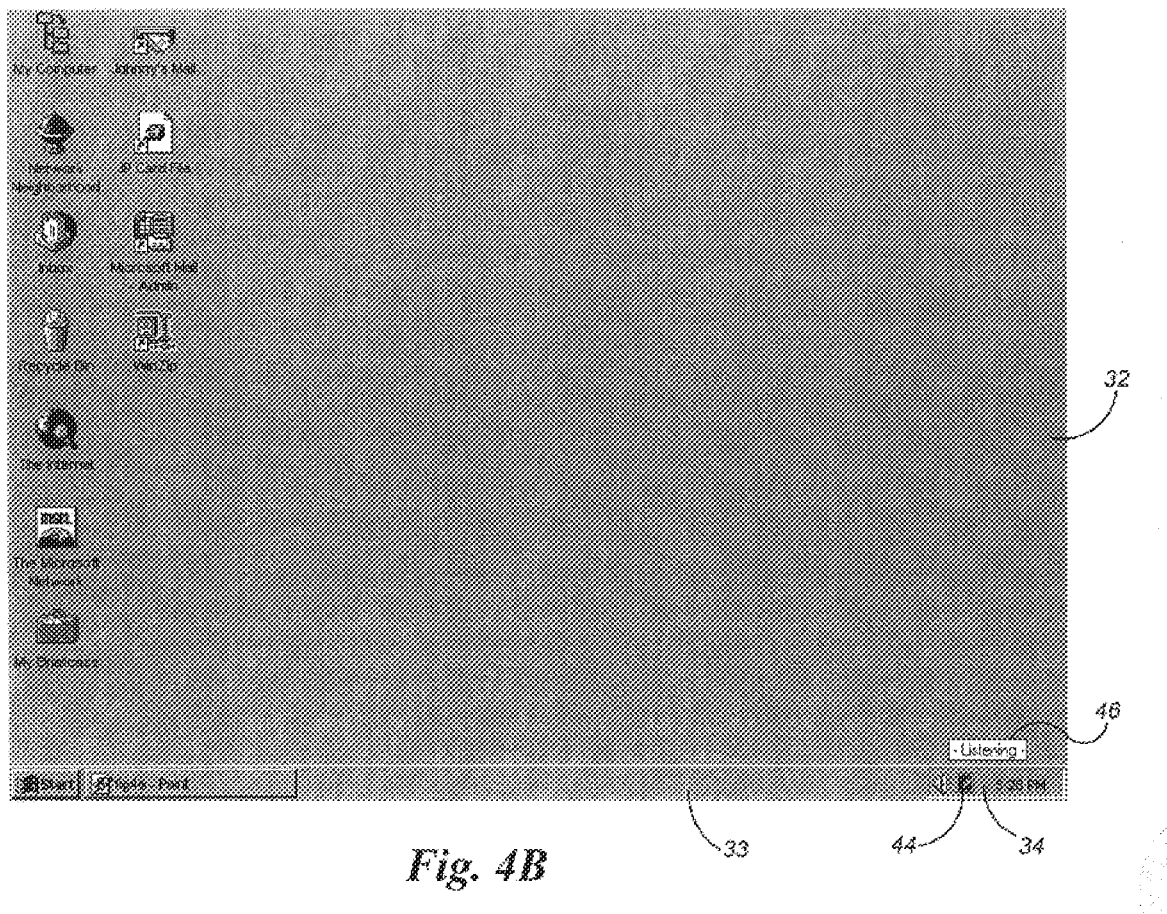
FIG. 4B illustrates the display of graphical and textual information in response to the changing of the state of the voice facility to the listening state.
Figure 4C:
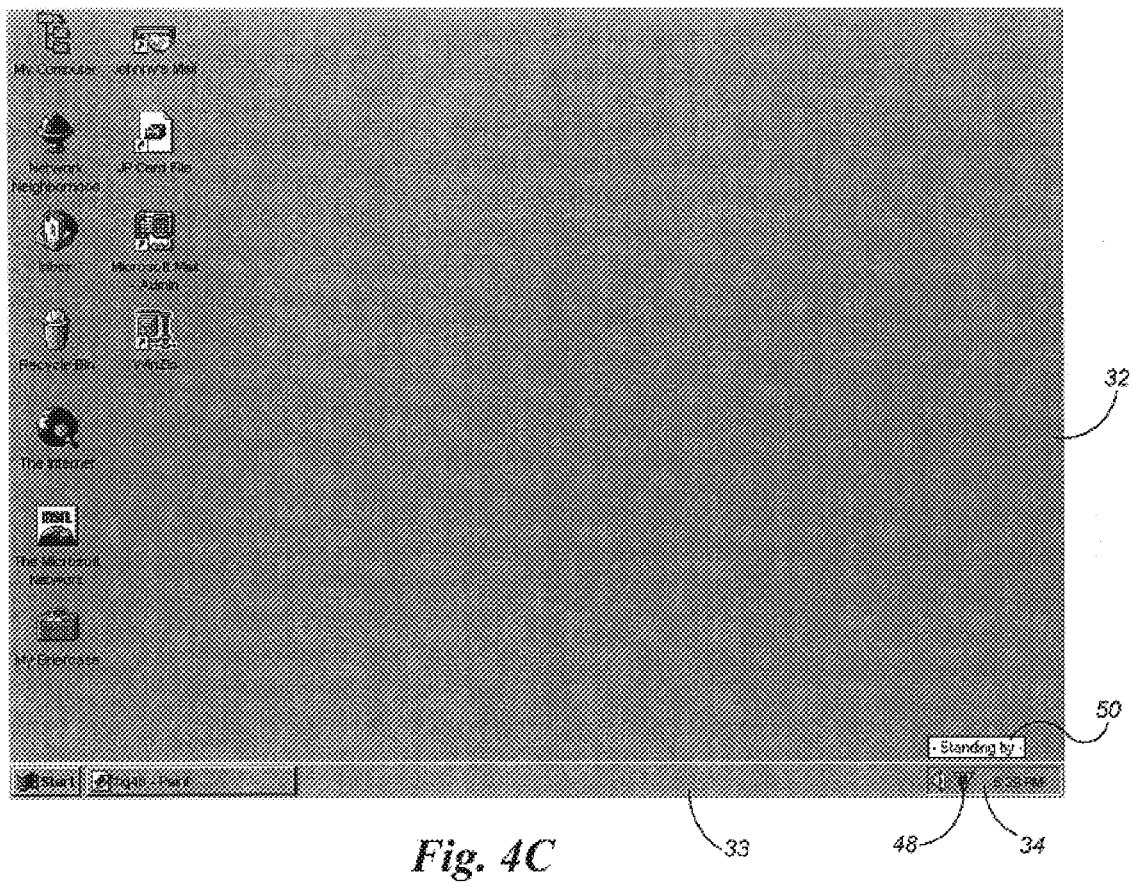
FIG. 4C illustrates the display of graphical and textual information in response to the changing of the state of the voice facility to the standing-by state.

A separate icon is provided for each of the three states. FIG. 4B shows the listening state icon 44, and FIG. 4C shows the standing-by state icon 48. FIGS. 3 and 4A show the non-listening state icon. When the voice facility state is changed, the state icon for the new state is displayed within the taskbar notification area 34. In addition, a tool tip that identifies the new state is displayed. FIG. 4A shows the tool tip 42 that is displayed when the state changes to the not listening state. FIG. 4B shows a tool tip 46 that is displayed when the state is changed to the listening state, and FIG. 4C shows the tool tip 50 that is displayed when the state is changed to the standing-by state. The voice facility 28 is responsible for providing the text for such tool tips and initiating display of the tool tips.

Figure 5:
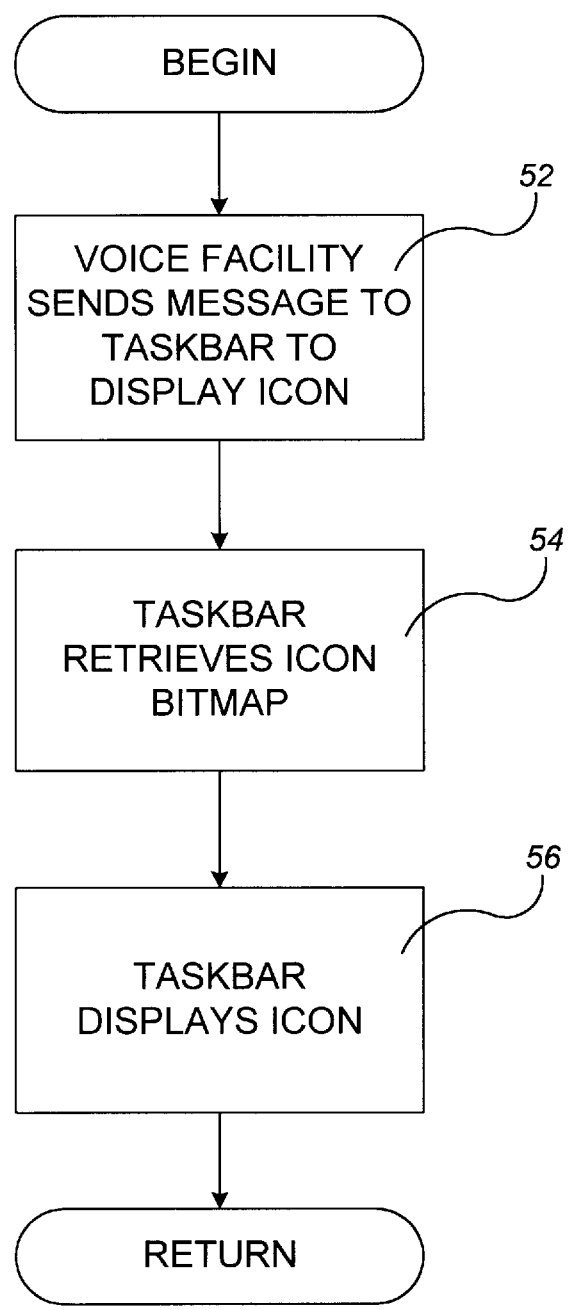
FIG. 5 is a flow chart illustrating the steps that are performed to display an icon by the voice facility in the graphical notification area.

FIG. 5 is a flow chart showing the steps that are performed in order for voice facility state icons to be displayed in the taskbar visual notification area. Initially, the voice facility 28 sends a message to the taskbar to display the appropriate state icon (step 52). This message includes identification information that enables the taskbar to identify where the bitmap for the icon is stored. The taskbar then retrieves the icon (step 54). Once the taskbar has retrieved the icon bitmap, the taskbar displays the icon using the bitmap (step 56).

Figure 6:
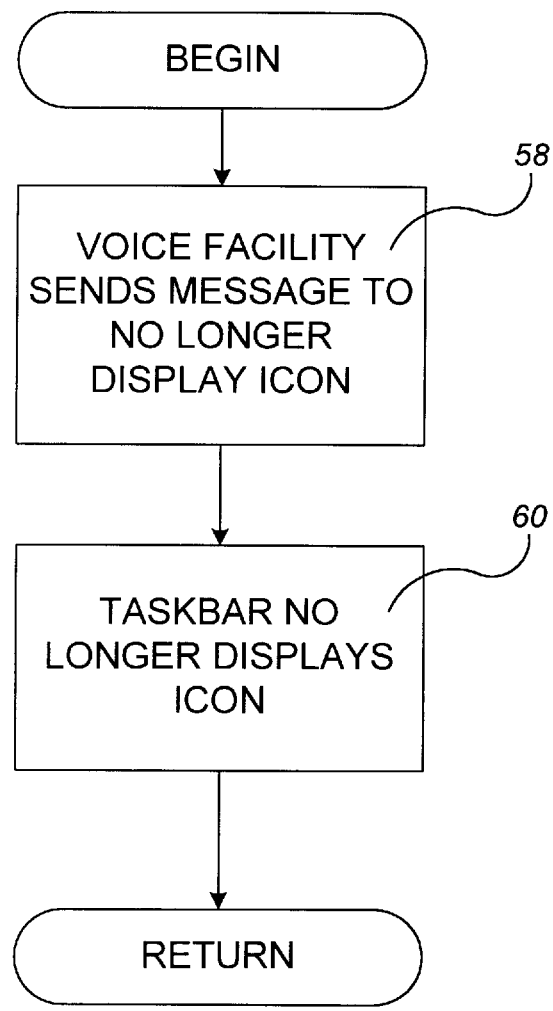
FIG. 6 is a flow chart illustrating the steps that are performed to remove an icon from the graphical notification area.

The removal of a state icon so that it no longer is displayed in the taskbar visual notification area 34 is also message-driven. First, the voice facility 28 sends a message to the taskbar to no longer display the state icon (step 58 in FIG. 6). The taskbar receives this message and, in response, removes the icon from the taskbar visual notification area 34 (step 60). If the voice facility is still active, the taskbar may then proceed to display a new state icon in the taskbar visual notification area.

The taskbar visual notification area 34 is a window. The taskbar knows where each icon is displayed within the taskbar visual notification area 34. As such, when the mouse cursor 50 is positioned over one of the state icons, the taskbar knows that the mouse cursor is pointing at one of the icons and asks the voice facility 28 what to do in response to the mouse cursor pointing to the state icon. The voice facility 28 causes a tool tip to be displayed after the expiration of a predetermined time period if the mouse cursor remains pointing at the state icon the tool tip identified that the state icon is associated with the "MICROSOFT VOICE" application.

Figure 7:
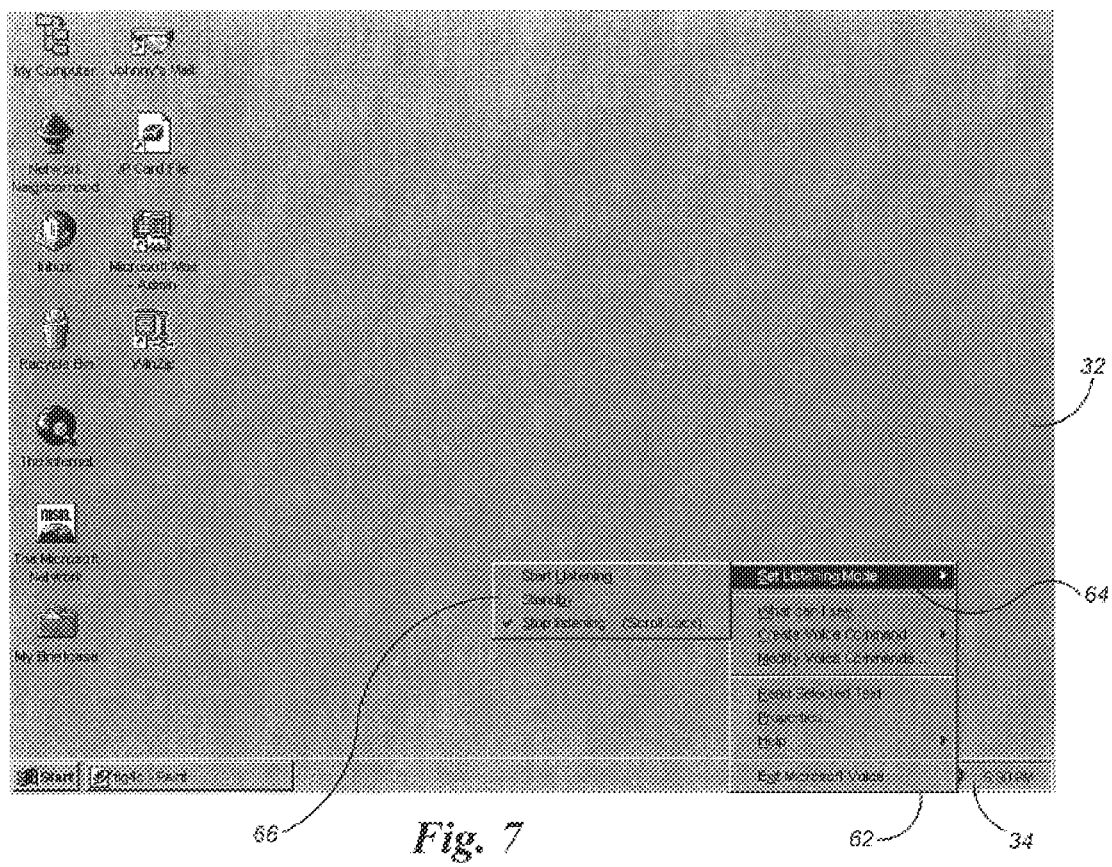
FIG. 7 illustrates a menu sequence that is displayed to enable a user to change current state of the voice facility per the preferred embodiment of the present invention.

As mentioned above, a user has the ability to select a current state for the voice facility 28. One manner in which the user may select the state of the voice facility 28 is through a state icon. If the user positions the mouse cursor 50 so that it points at the state icon that is displayed within the taskbar visual notification area 34 and depresses one of the mouse buttons a menu 62 (FIG. 7) is displayed. One of the choices on the menu 62 is a "Set Listening Mode" menu option 64 that present a slide-out menu 66. The slide-out menu 66 displays each of the available states and allows a user to select a state by positioning the mouse cursor on one of the states and releasing the mouse button. The current state is indicated by a check mark in the slide-out menu 66. For the example shown in FIG. 7, the voice facility 28 is currently in the not listening state. Alternatively, a dialog may be displayed rather than the slideout menu.

The voice facility 28 also provides the user with another type of status information. Specifically, the voice facility 28 provides the user with feedback regarding the audio input that has been entered by the user through the audio input device 24. In response to audio input, tool tips are displayed, and the state icon may be changed to icons that indicate the state of processing by the voice facility 28.

Figure 8:
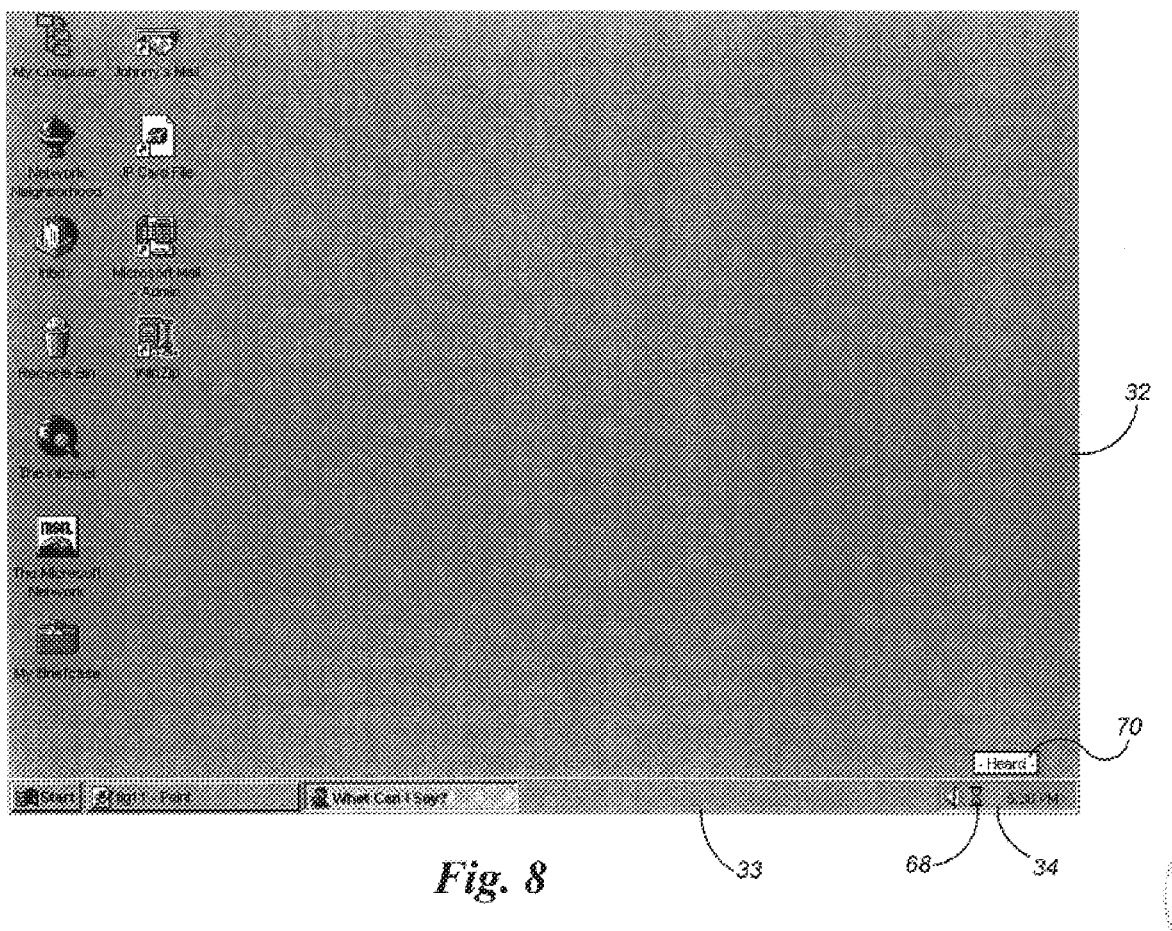
FIG. 8 illustrates the display of a tool tip that indicates that audio input was heard by the voice facility and the display of an icon that indicates that the voice facility is processing the audio input.
Figure 9:
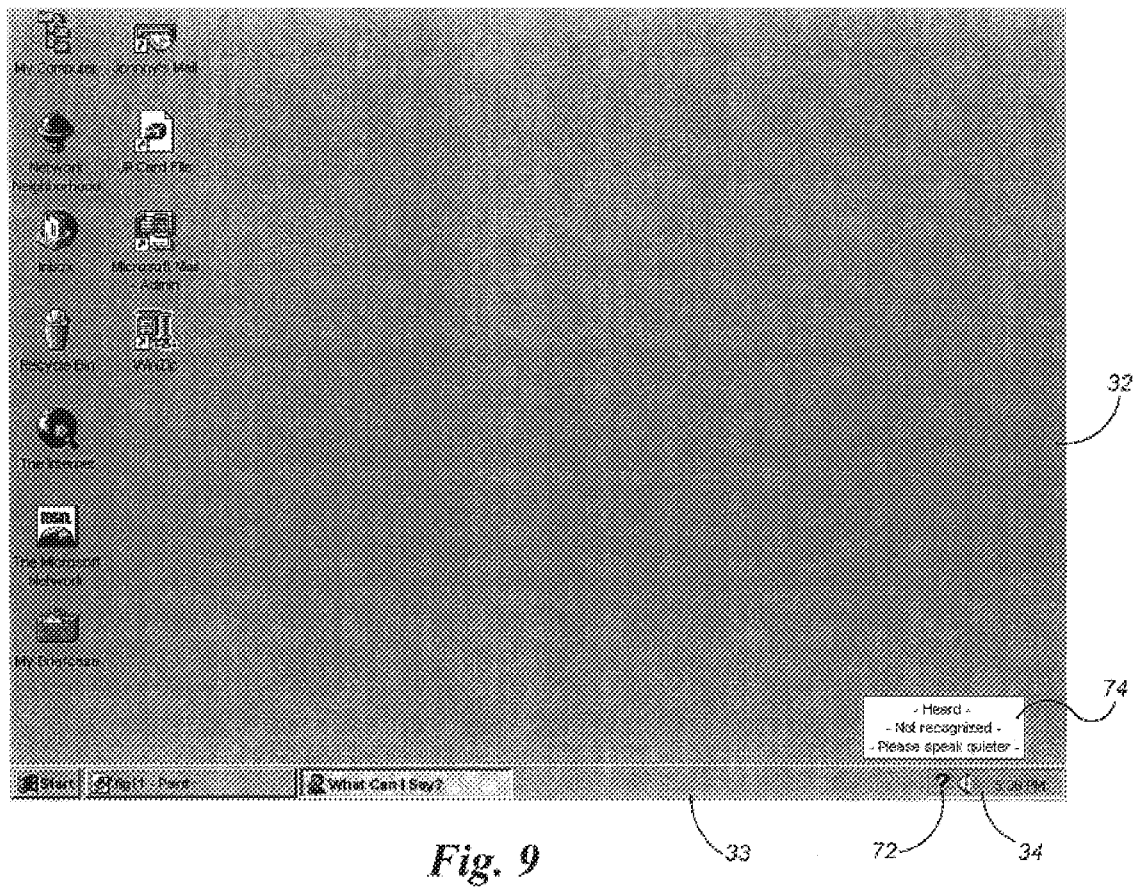
FIG. 9 illustrates a tool tip that indicates that audio input was heard, not recognized and too loud and also illustrates an icon that indicates the audio input was not recognized by the voice facility.

FIG. 8 shows an example of what is displayed to a user immediately after the user enters audio input that was sufficiently audible for the voice facility 28 to hear it. In particular, a tool tip 70 is displayed that indicates that the audio input was "Heard." In addition, the state icon is replaced with an icon 68 that indicates that the voice facility 28 is currently processing the audio input. If the voice facility does not recognize the voice commands that have been input as audio input by the user, the processing icon 68 is replaced with a question mark icon 72 as shown in FIG. 9. The question mark icon 72 is an intuitive indication that the voice facility 28 does not recognize the audio input. In addition, the phrase "Not recognized" will be displayed within a tool tip 74.

Figure 10:
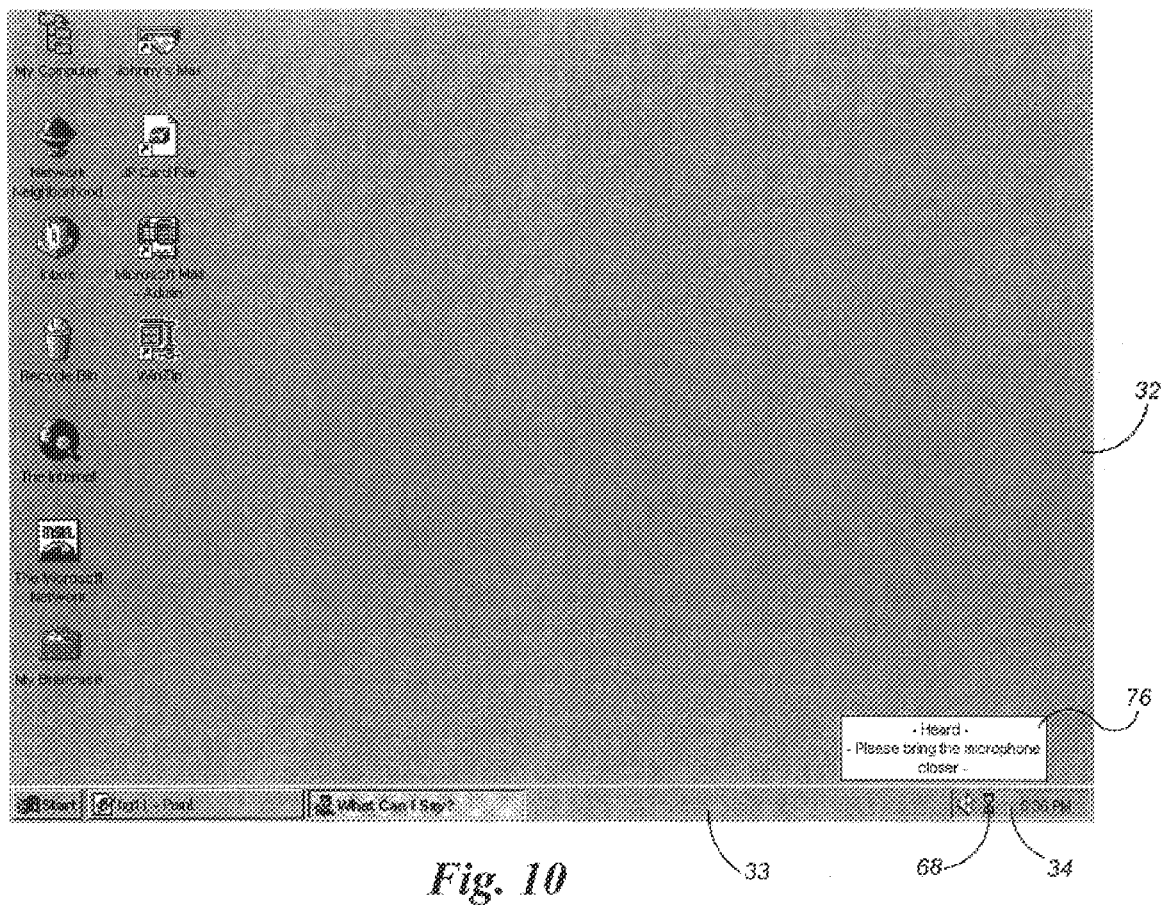
FIG. 10 illustrates the display of a tool tip that is generated when the signal to noise ratio of received audio input is below an acceptable level.
Figure 11:
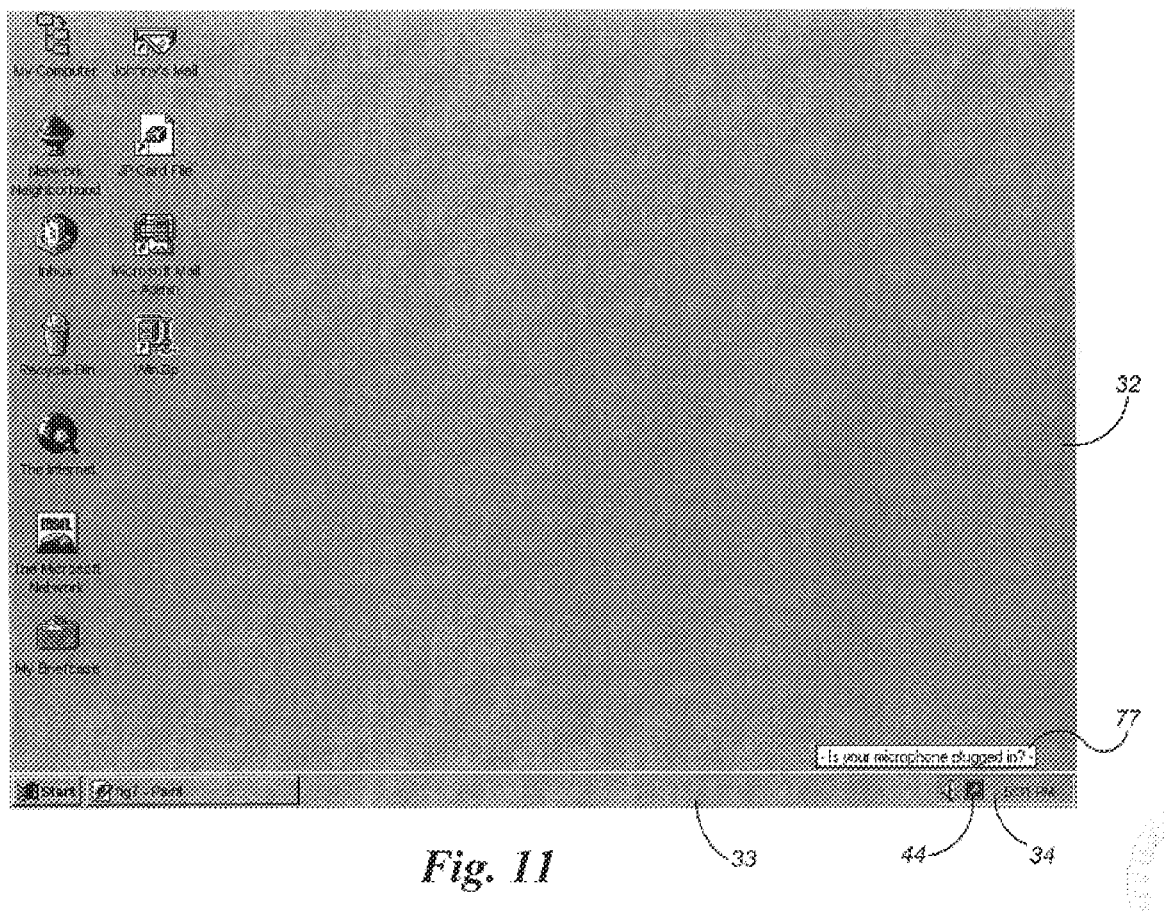
FIG. 11 illustrates the display of a tool tip that is displayed when the voice facility receives no audio input signal when in the listening state.

One of the reasons that the audio input may not be recognized is if the user is speaking too loudly into the audio input device 24. The voice facility 28 determines that the audio input is too loud when the audio input exceeds a given threshold of loudness. In such a case, the tool tip 74 also includes the message "Please speak quieter." The audio input may also be too quiet. The voice facility 28 conveys this feedback by displaying the message "Please speak louder" in a tool tip. Similarly, when the signal to noise ratio of the received audio input is too low, the message "Please bring the microphone closer" is displayed in a tool tip 76, such as shown in FIG. 10. If no audio input signal at all is received, a tool tip 77 (FIG. 11) that displays the message "Is your microphone plugged in?" is displayed.

Figure 12:
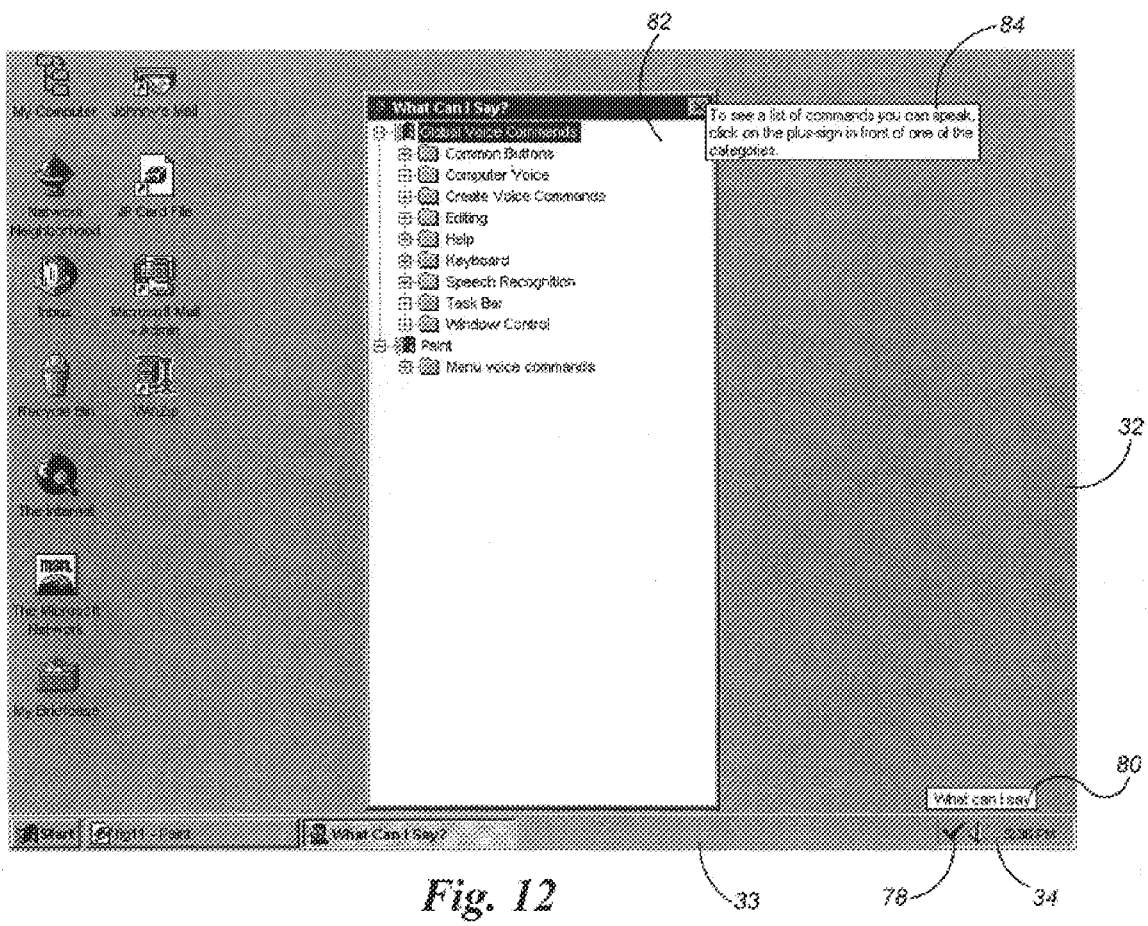
FIG. 12 illustrates an example of the appearance of the video display when a voice command is recognized by the voice facility.

The preferred embodiment of the present invention also provides feedback when the voice command input by a user is properly recognized. FIG. 12 shows an example wherein the voice command "What can I say?" is properly recognized. The recognition icon 78, which resembles a check mark, is displayed within the taskbar visual notification area 34. In addition, a tool tip 80 is displayed with the phrase "What can I say?" The voice facility 28 invokes the script that is associated with the command. In the example shown in FIG. 12 a window 82 is opened that provides a list of global voice commands. Furthermore, the voice facility 28 displays an additional tool tip 84 that explains operation of the hierarchical list that is displayed in the window 82.

While the present invention has been described with reference to a preferred embodiment thereof, those skilled in the art will appreciate that various changes in form and detail may be made without departing from the intended scope of the invention as defined in the appended claims. For example, tool tips that differ from those displayed in the figures may be used to practice the present invention. Similarly, different state icons may be used to practice the present invention, and different voice facility states (other than those described) may be used to practice the present invention.

We claim:

1. In a computer system having a video display, an audio input device for receiving audio input from a user and a speech recognizer for recognizing components of speech in audio input, said speech recognizer operating in a number of different modes of operation, a method comprising the computer-implemented steps of:

providing a graphical user interface on the video display, said graphical user interface including a designated notification area for displaying graphical notifications;

determining a first current mode of operation of the speech recognizer;

displaying a first graphical notification of the first current mode of operation of the speech recognizer in the designated notification area;

determining a second current mode of operation of the speech recognizer; and displaying a second graphical notification of the second current mode of the speech recognizer in the designated notification area, wherein the first notification differs from the second graphical notification.

2. The method of claim 1 wherein the first current mode of operation of the speech recognizer is determined to be a listening mode in which the speech recognizer is listening for and processing audio input received at the audio input device.

3. The method of claim 1 wherein the first current mode of operation of the speech recognizer is determined to be a non-listening mode in which the speech recognizer is not listening for or processing the audio input received at the audio input device.

4. The method of claim 1 wherein the first current mode of operation of the speech recognizer is determined to be a standing-by mode in which the speech recognizer is listening for and processing only selected audio input received at the audio input device.

5. The method of claim 1 wherein the step of displaying the graphical notification of the first current mode of operation of the speech recognizer in the designated notification area comprises displaying an icon that identifies the first current mode of operation of the speech recognizer in the designated notification area.

6. The method of claim 1 wherein the computer system runs an operating system and the operating system provides the graphical user interface.

7. The method of claim 1 further comprising the step of displaying text in a separate window that identifies the second current mode of operation.

8. The method of claim 7 further comprising the step of terminating the display of the text and the separate window after expiration of a predetermined time period.

9. The method of claim 1 wherein the computer system further comprises a mouse with at least one button, said mouse for manipulating a mouse cursor that points to locations on the video display and wherein the method further comprises the step of displaying a user interface element that enables the user to change the first current mode of operation of the speech recognizer in response to the mouse cursor pointing at the graphical notification and the user clicking the button on the mouse.

10. The method of claim 1 wherein the designated notification area does not obscure any other video output on the video display.

11. In a computer system having a video display, an audio input device for receiving audio input from a user and a speech recognizer for recognizing components of speech in audio input, a method comprising the computer-implemented steps of:
   receiving audio input from the user through the audio input device;
   processing the received audio input with the speech recognizer to attempt to recognize components of speech in the received audio input; and
   displaying textual feedback regarding the processing of the received audio input by the speech recognizer in a tool tip window that is only displayed for a predetermined period of time.

12. The method of claim 11 wherein the displayed textual feedback indicates that the received audio input was recognized by the speech recognizer.

13. The method of claim 12 wherein the displayed textual feedback indicates what the received audio input was recognized as.

14. The method of claim 11 wherein the displayed textual feedback indicates that the received audio input was heard by the speech recognizer.

15. The method of claim 11 wherein the displayed textual feedback indicates that the received audio input was not recognized by the speech recognizer.

16. The method of claim 11 wherein the displayed textual feedback indicates that there are problems with the received audio input that make it difficult for the speech recognizer to process the received audio input.

17. The method of claim 11 further comprising the steps of:
   providing a designated notification area on the video display for displaying graphical notifications by application programs;
   displaying a graphical notification in the designated notification area to provide feedback to the user about processing of the received audio input by the speech recognizer.

18. The method of claim 17 wherein the displayed graphic notification indicates that the received audio input was recognized by the speech recognizer.

19. The method of claim 17 wherein the displayed graphical notification indicates that the received audio input was not recognized by the speech recognizer.

20. A computer system comprising:
   a video display for displaying video images;
   an audio input device for receiving audio input from a user;
   a speech recognizer for recognizing components of speech in audio input received by the audio input device;
   a component for providing a graphical notification area on the video display for displaying different types of graphical notifications to the user; and
   a facility for displaying graphical notifications in the graphical notification area that identify current modes of operation of the speech recognizer.

21. The computer system of claim 20 further comprising a facility for displaying text in a window that identifies the current mode of operation of the speech recognizer.

22. The computer system of claim 21 wherein the facility for displaying text only displays in the window for a predetermined period of time.

23. A computer system comprising:
   a video display for displaying video images;
   an audio input device for receiving audio input from a user;
   a speech recognizer for recognizing components of speech in audio input received by the audio input device; and
   a first facility for displaying textual feedback to the user regarding processing of the received audio input by speech recognizer in a tool tip window that is only displayed for a predetermined period of time.

24. The computer system of claim 23 further comprising:
   a second facility for providing a graphical notification area on the video display for displaying graphic notifications;
   a third facility for displaying a graphical notification in the graphical notification area that provides feedback regarding processing of the received audio input by the speech recognizer.

25. In a computer system having a video display, an audio input device for receiving audio input from a user, a graphical user interface on the video display, said graphical user interface including a designated notification area for displaying graphical notifications and a speech recognizer for recognizing components of speech in audio input, said speech recognizer operating in a number of different modes of operation, a computer-readable medium holding computer-executable instructions for performing a method comprising the computer-implemented steps of:
   determining a first current mode of operation of the speech recognizer;
   displaying a first graphical notification of the first current mode of operation of the speech recognizer in the designated notification area;
   determining a second current mode of operation of the speech recognizer; and
   displaying a second graphical notification of the second current mode of the speech recognizer in the designated notification area, wherein the first notification differs from the second graphical notification.

26. The computer-readable medium of claim 25 wherein the first current mode of operation of the speech recognizer is determined to be a listening mode in which the speech recognizer is listening for and processing audio input received at the audio input device.

27. The computer-readable medium of claim 25 wherein the first current mode of operation of the speech recognizer is determined to be a non-listening mode in which the speech recognizer is not listening for or processing the audio input received at the audio input device.

28. The computer-readable medium of claim 25 wherein the first current mode of operation of the speech recognizer is determined to be a standing-by mode in which the speech recognizer is listening for and processing only selected audio input received at the audio input device.

29. The computer-readable medium of claim 25 wherein the step of displaying the graphical notification of the first current mode of operation of the speech recognizer in the designated notification area comprises displaying an icon that identifies the first current mode of operation of the speech recognizer in the designated notification area.

30. The computer-readable medium of claim 25 wherein the computer system runs an operating system and the operating system provides the graphical user interface.

31. The computer-readable medium of claim 25 wherein the method further comprises the step of displaying text in a separate window that identifies the second current mode of operation.

32. The computer-readable medium of claim 31 wherein the method further comprises the step of terminating the display of the text and the separate window after expiration of a predetermined time period.

33. The computer-readable medium of claim 25 wherein the designated notification area does not obscure any other video output on the video display.

34. In a computer system having a video display, an audio input device for receiving audio input from a user and a speech recognizer for recognizing components of speech in audio input, a computer-readable medium holding computer-executable instructions for performing a method comprising the computer-implemented steps of:

receiving audio input from the user through the audio input device;

processing the received audio input with the speech recognizer to attempt to recognize components of speech in the received audio input; and displaying textual feedback regarding the processing of the received audio input by the speech recognizer in a tool tip window that is only displayed for a predetermined period of time.

35. The computer-readable medium of claim 34 wherein the displayed textual feedback indicates that the received audio input was recognized by the speech recognizer.

36. The computer-readable medium of claim 35 wherein the displayed textual feedback indicates what the received audio input was recognized as.

37. The computer-readable medium of claim 34 wherein the displayed textual feedback indicates that the received audio input was not recognized by the speech recognizer.

38. The computer-readable medium of claim 34 wherein the displayed textual feedback indicates that there are problems with the received audio input that make it difficult for the speech recognizer to process the received audio input.

* * * * *